United States Patent [19]

Pasche et al.

[11] Patent Number: 4,472,235
[45] Date of Patent: Sep. 18, 1984

[54] APPARATUS FOR MAKING PROFILED BARS COMPRISING PROFILED METAL CORES AND PROFILED FACINGS

[76] Inventors: Heinz Pasche; Jürgen Schön, both of Ahrensburger Strasse 44, 2000 Hamburg 70, Fed. Rep. of Germany

[21] Appl. No.: 426,176

[22] Filed: Sep. 28, 1982

[30] Foreign Application Priority Data

Nov. 1, 1981 [DE] Fed. Rep. of Germany ....... 3144543

[51] Int. Cl.³ .......................... B31F 1/00; B31F 5/00; B32B 31/04; B30B 5/02
[52] U.S. Cl. .................................... 156/461; 156/549; 156/555; 156/583.5; 118/208; 118/307; 118/262
[58] Field of Search ............... 156/324, 461, 547–551, 156/555, 578, 583.5, 202, 200; 118/227, 262, 208, 305, 307

[56] References Cited

U.S. PATENT DOCUMENTS

| | | | |
|---|---|---|---|
| 2,205,564 | 6/1946 | Johnstone | 118/262 |
| 2,912,043 | 11/1959 | Bargholtz et al. | 156/201 |
| 2,916,398 | 12/1959 | Marvin | 118/262 |
| 3,054,440 | 9/1962 | Pio | 156/200 |
| 3,680,346 | 8/1972 | Wilcox | 29/243.5 |

FOREIGN PATENT DOCUMENTS

508366 11/1976 Australia ............................ 156/461

Primary Examiner—Edward C. Kimlin
Assistant Examiner—Merrell C. Cashion
Attorney, Agent, or Firm—Toren, McGeady and Stanger

[57] ABSTRACT

Apparatus is provided for making profiled bars for windows, doors and other frames. The profiled bars are profiled metal cores and profiled facings having angled side flanges. The apparatus includes a carrying frame, a conveyor line for handling the profiled metal cores, an adhesive-applying station in the carrying frame, tangentially extending feeders with conveying members for handling profiled facings to be applied to opposite sides of the profiled metal cores, which feeders are provided on the carrying frame behind the station in the direction of travel of the conveyor line and include spreading wedge assemblies for spreading angled side flanges beyond edges of side walls of the profiled metal core. To permit an adaptation of the profiled facings to any distortion of the profiled metal cores, the adhesive-applying station comprises subassemblies which are disposed on opposite sides of the conveyor line and include applying rollers which have vertical axes and are pivotally mounted for automatic adaptation to any distortion of the profiled metal core which is to be coated, the feeders include belt guides, which are mounted close to the side faces of a profiled metal core, and converging members for applying contact pressure to the angled side flanges are provided in the belt guides.

7 Claims, 22 Drawing Figures

APPARATUS FOR MAKING PROFILED BARS COMPRISING PROFILED METAL CORES AND PROFILED FACINGS

BACKGROUND OF THE INVENTION

Such apparatus is known from Australian Pat. No. 508,366. In that known apparatus, the adhesive is applied by spraying. This may result in irregularities, which will not be entirely compensated if rigid applying means are provided, which do not permit a control of the application rate. But a uniform application of an adhesive which is activated at elevated temperature is of special significance for a close adaptation to the surfaces of the profiled metal core. The adhesive is applied to vertical surfaces of the profiled metal core.

An exact, uniform application of adhesive is essential for a smooth fit of the profiled facings, which constitute the visible surfaces of the composite profiled bar and must be firmly secured without disturbing the uniformity of the adhesive layer.

If an adhesive which is activated at elevated temperatures is employed, a heating line is provided between the adhesive-applying station and the feeders for the profiled faacings. This is included.

The profiled metal core consists preferably of aluminum. The profiled facings consist suitably of polyvinylchloride, preferably of soft polyvinylchloride.

German Patent Specification No. 1,042,215 discloses box sections which consist of metal and are provided with projections on both sides of the side walls which are parallel to the plane of the frame, and C-section plastic elements provided on the inside and outside of the box sections. That design results in an improved heat insulation because insulating members are provided on the inside and outside.

SUMMARY OF THE INVENTION

It is an object of the present invention so to improve an apparatus of the kind described first hereinbefore that a smooth fit of the profiled facings on the outside surfaces of the profiled metal core and a reliable embracing of the edges of said core by the profiled facings is ensured, a uniform application of the adhesive in adaptation to the shape of the profiled metal cores is ensured by a relatively simple device, and the profiled facings are supplied in such a manner that a reliable fit in surface contact with the adhesive and a uniform and smooth bond is ensured.

This object is accomplished in that the adhesive applying station comprises subassemblies which are disposed on opposite sides of the conveyor line and include applying rollers which have vertical axes and are pivotally mounted for automatic adaptation to any distortion of the profiled metal core which is to be coated, the feeders include belt guides, which are mounted close to the side faces of a profiled metal core, and converging means for applying contact pressure to the angled side flanges are provided in the belt guides.

The combination of the applying rollers, which are pivotally mounted so that they can be adapted to the profiled metal core, with feeders having side faces provided with special converging means for forcing the side flanges to the side faces of a profiled metal core by means of belt guides results in a uniform, smooth fit of the profiled facings even though the latter have previously been expanded. Such an arrangement is particularly suitable where soft polyvinylchloride is employed.

The subassemblies provided in the adhesive-applying station are preferably pivoted on pivots, which are mounted in the carrying frame and extend parallel to the conveyor line, and include pivotal aligning means. The rotation about the pivots will result in an automatic adaptation to the side faces. Profiled bars of metal, particularly aluminum, may be distorted so that adhesive applied by means of rigidly mounted rollers may not contact certain portions of the surfaces of the profiled metal core. This will be avoided by the use of pivoted subassemblies, which will readily be adapted. The aligning means serve also as counterbalancing means and may consist of pendulum weights for a close adaptation to the surfaces of the profiled cores which impart a pivotal movement as they pass by.

According to another preferred embodiment, the pivoted subassemblies comprise a carrier, which carries pivot pins extending at right angles to the pivots. A holder is pivoted to the pivot pins and an adhesive-applying roller is rotatably mounted in said holder and defines a nip with an adhesive-transferring roller. Adjusting means are provided for adjusting the clearance between the adhesive-transferring roller and the applying roller. The clearance can be adjusted at the top and bottom. The holder is preferably two-armed and has an upper mounting arm and a lower mounting arm, each of which is pivoted on top and bottom portions of the pivot pin. The adhesive-transferring roller may be mounted with a backlash in two pivoted arms. Tension springs are provided, which are connected at one end to the two mounting arms of the holder and at their other end to the pivoted arms. Adjusting screws are provided in the upper and lower portions of each mounting arm and have heads which apply pressure to the pivoted arms in opposition to the action of the tension springs. The clearance between the adhesive-applying rollers and the adhesive-transferring rollers can be finely adjusted for a fine control of the thickness of the adhesive layer which is applied. The two adjusting screws permit a fine adjustment of the thickness of the adhesive layer. The adhesive layers applied at the top and bottom may differ in thickness.

In a particularly preferred arrangement, a compression spring and means for adjusting said compression spring are provided between the mounting arms and the carrier and an adjusting screw is provided between the mounting arms and the holder. This will result in an automatic adaptation to the side faces of the profiled metal core and will permit an adjustment of the contact pressure of the adhesive-transferring roller. The thickness of the adhesive layer can be controlled by an adjustment of the clearance between the applying and transferring rollers and that clearance will be maintained during an adjustment of the subassembly. In dependence on the consistency of the adhesive, influences of gravitation during an application of the adhesive to vertical side faces of the profiled metal cores can be compensated. The resulting subassembly is simple and capable of various adjustments The adhesive-applying roller may have associated with it an adhesive feeder including an adhesive source and a resilient doctor, which at its edges that faces the applying roller is adjustably supported at its top and bottom by respective screws. This will permit of compensating adjustments at the doctor.

In a particularly preferred embodiment, such belt guide comprises conveyor and contact pressure rollers at one end immediately before the adhesive-applying station and closely behind the point where the profiled facing is applied. One portion of the belt guide is directly parallel to the conveyor line. Another portion of the belt guide is inclined and extends at an acute angle to the conveyor line opposite to the direction of travel of the latter. Supply drums for the striplike profiled facings are mounted on the carrying frame at a distance from the inclined position and deflecting rollers are provided between the inclined portion to the portion which is parallel to the conveyor line and serve to guide the expanded profiled facings to the profiled metal core. The converging means are provided in the portion which is parallel to the conveyor line so that the profiled metal core will be reliably covered by the profiled facing.

The deflecting rollers for deflecting the striplike profiled facing engage the latter on the side which is opposite to its flanges and constitute means for maintaining said flanges expanded in the region in which the strip is deflected. This will ensure a reliable application without a risk of an interfering contact as the flanges are converged.

Each of the expanding wedge assemblies provided in each of those portions of the belt guides which are inclined to the conveyor line preferably comprises an expanding wedge having outside surfaces for guiding the angled side flanges and said expanding wedge consists of two expanding members, which are pivotally movable relative to each other and are pivoted to an expanding wedge housing, which includes adjustably mounted expanding means. By means of such an expanding wedge assembly, the profiled facing can be expanded exactly to the required extent in the region in which said profiled facing at the end of the inclined feeder is delivered to the profiled metal core at the same velocity as the latter and the correct relation to the profiled metal core can be adjusted.

By means of the expanding wedge assembly which is capable of a fine adjustment, the profiled facings can be influenced in such a manner, also in dependence on the nature of said profiled facings, that they are just sufficiently expanded to ensure their application to the profiled metal cores whereas an excessive expansion is avoided and it is ensured that the facing has resumed its normal shape when it has passed through the expanding wedge assembly.

The expanding means consist suitably of rotatable adjusting pins, preferably screws, and are provided with eccentric pins, and the expanding members are formed with slots, which receive the eccentric pins, whereas the adjusting pins are guided in the expanding wedge housing. This results in a relatively simple structure. The reliable fit and the parallel guidance are improved in that a retaining screw is screwed in a tapped hole of each expanding member and extends through a slot, which is formed in the housing and concentric to the pivot bearing, and said retaining screw has a head flange which rests on a guiding surface is parallel to the plane in which the expanding wedge members are pivotally movable.

In a desirable embodiment, the converging means succeed the expanding wedge means and are disposed in the portion which is parallel to the profiled metal core and comprise a channel member having legs which extend over the side flanges and converge in the direction of travel of the conveyor line. The channel member may be C-shaped. The extent of the legs will depend on the extent of the side flanges. Particularly, the converging means are replaceably mounted in the carrying frame adjacent to the belt guides, the web is suitably disposed behind the conveyor belts regarding the conveyor line or the inner profiled bar of metal, and the legs extend over the belts of the strip guides. As a result of this arrangement, the subsequently visible surface of the profiled facings will not be subjected to any friction so that damage to that surface will be avoided.

If the profiled metal cores comprise intermediate box sections and longitudinal webs protruding upwardly or downwardly from one side of the box sections, easily adjustable means for applying pressure to said webs of the profiled metal core are preferably provided. For this purpose the carrying frame is suitably provided with guide beams, which are disposed over and under the conveyor line and carry pivot bearings having vertical axes, and pivoted levers are mounted in said pivot bearings. These pivoted levers are provided on the level of one web of the profiled metal core and carry at one end a vertically adjustable backing roller, which is disposed between the outer contact pressure rollers on an axis of rotation which exactly coincides with the axis of the pressure applied by the outer contact pressure rollers. The other end of the pivoted levers cooperates with an adjusting device, which is adjustably supported by the guide beams and has an adjusting screw, which is at right angles to the axis of the pivot bearing. That adjusting screw can directly engage the pivoted lever. A compression spring may be provided between the adjusting screw and the pivoted lever.

If the profiled metal core is provided with longitudinal webs protruding from different sides of an intermediate box section, means for adjusting top and bottom pivoted levers are suitably provided on different sides of the conveyor line.

BRIEF DESCRIPTION OF THE DRAWING

The invention will now be described with reference to illustrative embodiments shown on the drawings, in which FIG. 16 is a top plan view showing converging means of FIG. 6, FIG. 17 is an end view of part of FIG. 16 and shows the upper portion (the lower portion is similar), FIG. 18 is a sectional view taken on line XVIII—XVIII in FIG. 16, FIGS. 19a to 19c are three transverse sectional views showing the striplike profiled facing in different states and FIG. 20 is an elevation showing part of FIG. 19c viewed from the right.

DETAILED DESCRIPTION OF THE INVENTION

Figures 1, 2:
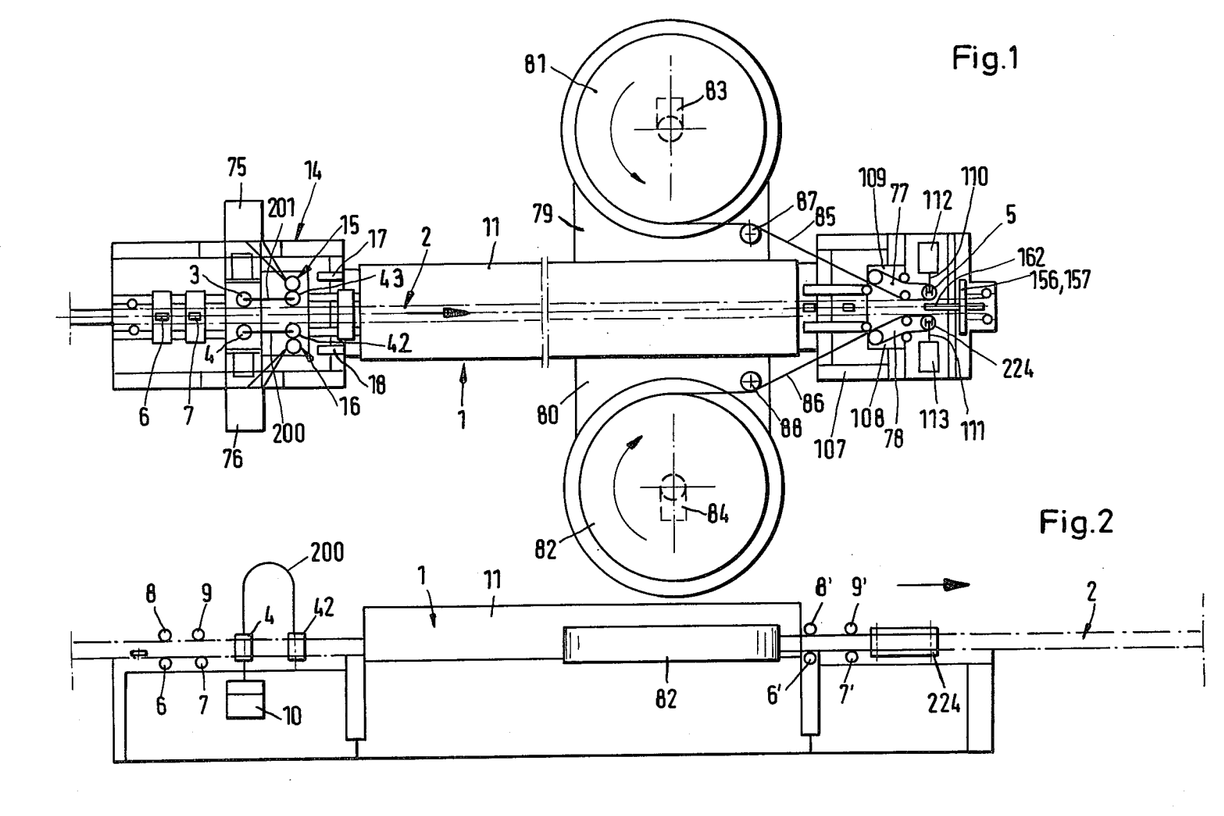
FIG. 1 is a partly shortened and partly diagrammatic top plan view showing apparatus according to the invention.
FIG. 2 is a diagrammatic side elevation showing the apparatus of FIG. 1.

The carrying frame generally designated 1 is shown in FIGS. 1 and 2 and carries means for mounting the parts which are carried by the carrying frame and cooperate with each other. A conveyor line 2 extends through the carrying frame and includes driven conveyor rollers 3, 4, 5, 224, the latter of which will be described hereinafter also in a different function. These rollers convey the profiled metal cores. Motor and transmission means 10 are associated with said conveyor rollers, as is shown, e.g., for the conveyor roller 4 in FIG. 2. This applies also to the two conveyor rollers 3, 4, with which motor and transmission means having two drive shafts are associated in order to ensure a synchronous drive. The conveyor rollers 3, 4 are connected by flexible shafts 200, 201 to rollers 42, 43 of the adhesive-applying station 14, which will be described hereinafter.

Supporting and guiding rollers 6, 7; 8, 9 and 6', 7'; 8', 9' are provided and mounted in the conveyor line at the top and bottom so that a reliable guidance in the intermediate region is ensured even in upstanding side webs. These rollers may also be driven.

A heater or furnace 11 is provided in the intermediate portion of the conveyor line 2 and is only diagrammatically illustrated.

The adhesive-applying station generally designated 14 has on each side a subassembly 15 or 16, which is pivoted on pivotal mounting means 17, 18.

Figure 3:
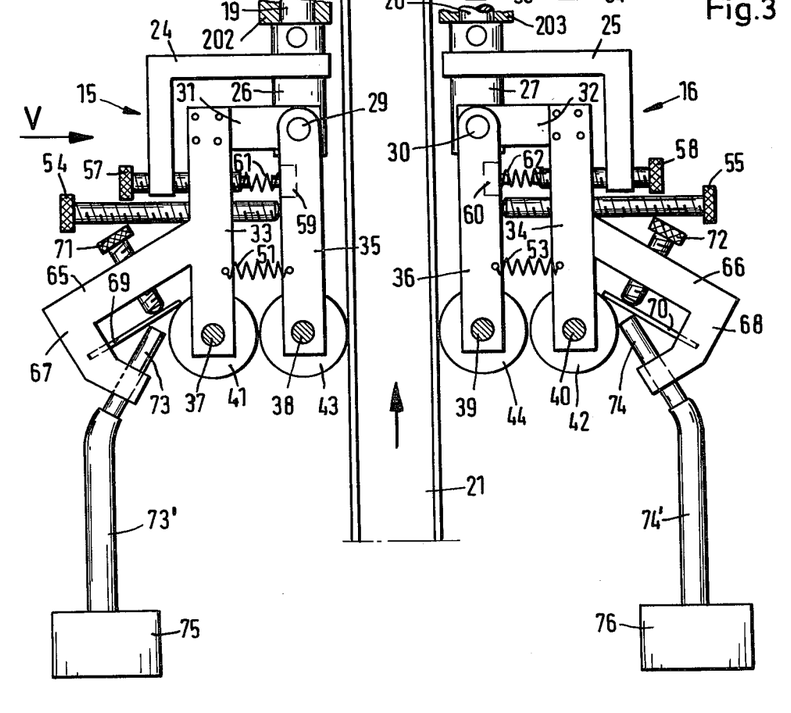
FIG. 3 is an enlarged top plan view showing details of the adhesive-applying station of FIG. 1.
Figure 4:
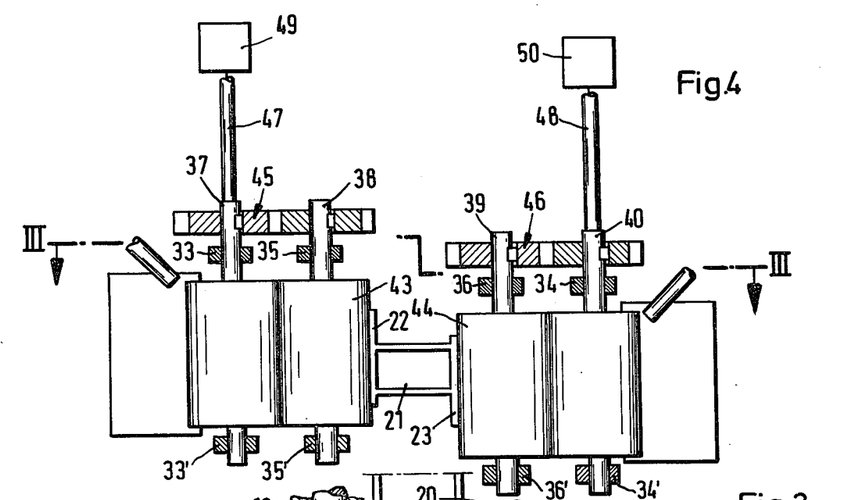
FIG. 4 is a partly sectional end view of the station of FIG. 4 for an explanation of its function.

In accordance with FIG. 3, these pivotal mounting means 17, 18 include bearing brackets 202, 203, which are rigid with the carrying frame and in which pivots 19, 20 are rotatably mounted. These pivots extend on opposite sides of the conveyor line 2 and of the profiled metal core 21, which is shown in FIGS. 3 and 4 and has longitudinal webs 22, 23, which protrude at the top and bottom on different sides from the box-shaped intermediate portion. The guiding means of the conveyor line are not shown in FIGS. 3 and 4.

Figure 5:
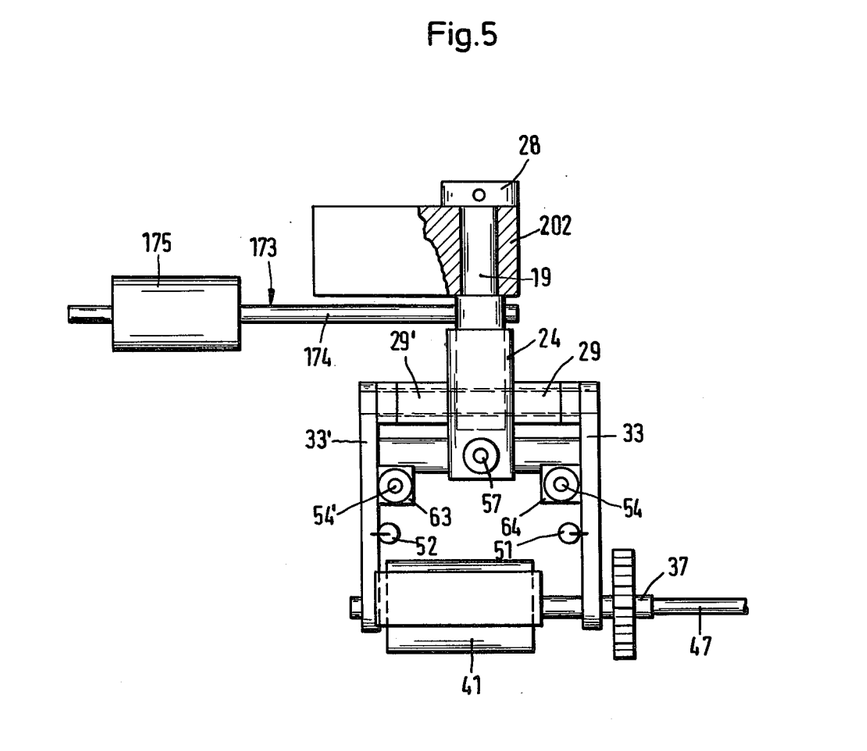
FIG. 5 is a side elevation of a subassembly of the adhesive-applying station of FIG. 3 viewed in the direction of the arrow V in FIG. 3.

Each of the subassemblies 15 and 16 which are pivoted on the pivots 19, 20 comprises a carrier 24 or 25, which is rigid with a bushing 26 or 27, which belongs to the carrier and is mounted on one of the pivots 19 and 20. That bushing 26 or 27 which constitutes part of the carrier is thus rotatably mounted by means of one of the pivots 19, 20 and is axially aligned, e.g., by means of an adjusting ring 28 (FIG. 5).

Pivot pins 29, 29' (FIG. 5), 30 are mounted on the carrier, particularly the bushing 26, 27, and extend at right angles to the pivots 19, 20, particularly in a vertical direction. Holders 31, 32 are pivoted on said pivot pins and comprise rigid holder structures 33, 34 and a relatively movable arrangement comprising mounting arms 35, 36, which consist of pairs of arms 35, 35' and 36, 36' as is shown in FIG. 4. As a result, each of the holder structures 33, 34 and 33', 34' is bipartite and the parts of each holder structure are separately pivoted at the top and bottom on the pivot pins 29, 29' and 30. Axles 37, 39 and 39, 40 for adhesive-applying rollers 41, 42 and adhesive-transferring rollers 43, 44, respectively, are axially immovably mounted between the lower parts of the holder structures 33, 33' and 34, 34', on the one hand, and the mounting arms 35, 35' and 36, 36'. Transmission 45, 46 are provided between the axles 37, 38, on the one hand, and 39, 40, on the other hand, and ensure a synchronous rotation. FIG. 3 is a sectional view taken on line III—III in FIG. 4 because the transmissions 45, 46 are not shown in FIG. 3.

The axles 37, 40 are driven via flexible shafts 47, 48 either by synchronously operating motors 49, 50, as is basically indicated in FIG. 4, or are preferably connected to the driven conveyor rollers 3, 4 (FIG. 1). The advance is synchronous with respect to the conveyor rollers and the adhesive-applying station shown in FIGS. 3 and 4 in that the adhesive-applying rollers 43, 44 are equal in diameter to the conveyor rollers 3, 4 and driven at the same speed. In a preferred embodiment the flexible shafts 47, 48 are identical to the flexible shafts 200, 201 of FIGS. 1 and 2.

Tension springs 51, 52 and 53 are provided between the holder structures 33, 34 (FIG. 3) having rigid holders 31, 32, on the one hand, and the mounting arms 35, 36, and pull the holder parts provided with the rollers 41, 43 and 42, 44 apart so that the rollers roll in contact with each other as far as possible.

Two adjusting screws 54, 55 are provided between the holder structures 33, 31 and 34, 32, on the one hand, and the mounting arms 35, 36, on the other hand, and adjusting screws 54' are provided under the adjusting screws 54, 55 in the corresponding holder structure arms not visible in FIG. 3. These adjusting screws can be actuated to extend the tension springs 51 to 53 and adjust the clearance between the rollers 41, 43 and 42, 44 along the length of the rollers because upper and lower tension springs and adjusting screws are provided. The adjusting screws are mounted in tapped holes of the holder structures 33 (33') and 34. By means of an adjusting screw 57, 58, which is disposed approximately in the middle of the axial length of the rollers 41 to 44, the holder structures 31, 33, 35 and 32, 34, 36 are adjustable in adaptation to the profiled metal core which is to be coated. The adjusting screws 57, 58 extend through tapped bores in the angle beams 24, 25 of the holder structures and each of said adjusting screws is supported by means of a compression spring 61, 62 on a beam 59 or 60 which connects the mounting arms 35, 36 or 35', 36'. That compression spring is disposed between the beam 59 or 60 and the adjusting screw 57 or 58.

The adjusting screws 54, 54' and 55 are internally guided on lugs 63, 64 (FIG. 5), which are mounted on legs 33, 33' or 34, 34' of the holder structures. For this guidance, the screws extend through a tapped hole, just as the adjusting screws 57, 58 extend through tapped holes of the beams 24, 25.

In the present embodiment the bushings 26, 27 of the pivoted subassemblies 15, 16 have depending aligning means (counterbalancing means), one of which is designated 173 in FIG. 5. That element consists of a radially protruding pendulum rod 174, on which a pendulum weight 175 is mounted, which is adjustable, e.g., by means of screw threads or an adjusting screw. This arrangement ensures that the axes of the rollers will be held in a vertical orientation but the subassemblies are pivotally movable so that the rollers adapt themselves to the profiled core which is passing through, i.e., the rollers follow the inevitable distortions of said core so that a uniform application of pressure to the two surfaces will be ensured.

The holder structures 33, 34 are provided with protruding inclined carrying arms 65, 66, which at their outer ends have angled arms 67, 68, in which a doctor 69, 70 of resilient material is gripped. The doctor is gripped only at the top or bottom so that the clearance can be adjusted by means of adjusting thrust screws 71, 72. Like other elements, the carrying arms 65, 66 consist of upper and lower legs. In dependence on the arrangement of the doctor, the selected upper and lower legs are provided with the thrust screws 71, 72, which are in threaded engagement with tapped holes in the legs and act on the ends of the doctor 69 or 70 near the upper and lower ends of the axles of the rollers so that the free end of the doctor is exactly adjusted to control the thickness of the layer of adhesive applied to the rollers 41 and 42. A feeding tube 73, 74 connected to an adhesive supply source 75, 76 has an outlet opening in the tapering gap between each doctor 69, 70 and the applying roller 41 or 42. The feeding tubes 73', 74' consist of elastic material so that they can follow adjusting movements of the subassemblies 15, 16. The feeding tubes 73, 74 are fixed in the angled arms 67, 68 in an extension, which may be angled too, so that the outlet openings are aligned in a defined manner with the doctors 69, 70, on the one hand, and the adhesive-applying rollers 41, 42. The sources 75, 76 are mounted in the carrying frame 1 as is shown in FIG. 1.

In accordance with FIG. 1, the conveyor line 2 and particularly the furnace 11 is succeeded in the direction of travel by an arrangement comprising two tangential feeders 77, 78. These feeders are supplied with the facing material, which preferably consists of strip-like profiled facings which are processed by rollers. These feeders 77, 78 or roller holders are mounted in the carrying frame by means of crossbeams 79, 80 and are provided with supply drums 81, 82, the axle of which is under the action of an adjustable braking device 83, 84. The strip-like profiled facings are stored on said supply drums and are fed to the feeders 77, 78 along the paths 85, 86 shown in FIG. 1. Guide rollers 87, 88 may be rotatably mounted in the carrying frame and particularly on the crossbeams 79, 80 to ensure a proper feeding.

Figure 6:
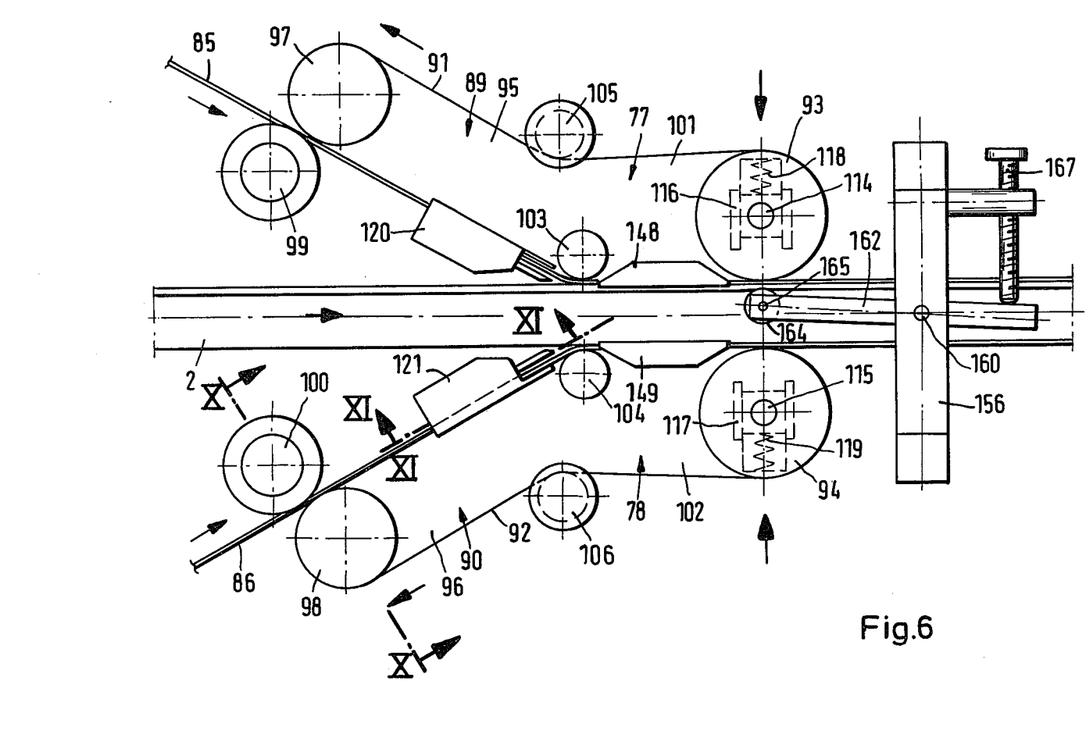
FIG. 6 is a diagrammatic top plan view showing feeders in the conveyor line of FIG. 1.
Figure 7:
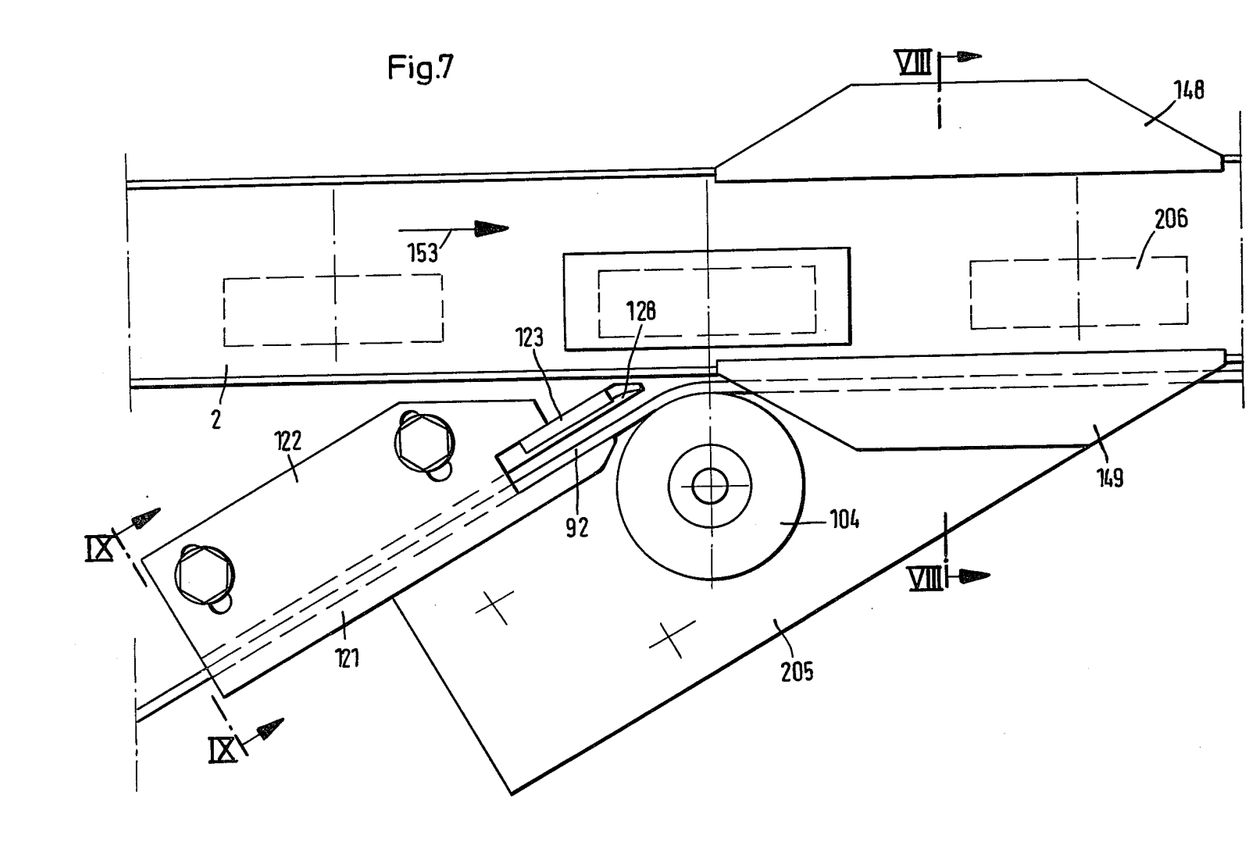
FIG. 7 is a detailed top plan view showing a portion of FIG. 6.

These feeders 77, 78 are shown on a larger scale in FIG. 6. The feeders 77, 78 consist of belt guides 89, 90, which comprise endless conveyor belts 91, 92, which extend closely beside the conveyor line 2 and of the profiled core bar handled thereby and are trained around contact pressure rollers 93, 94, which are identical to the conveyor rollers 5 and 6 in FIG. 1. In a path 95, 96 which extends from the conveyor line at an acute angle thereto opposite to its direction of travel, the conveyor belts 91, 92 are trained around conveyor rollers 97, 98. Rollers 99, 100 for vertical guidance are mounted in the carrying frame on the other side of the paths 85, 86 and associated with the conveyor rollers 97, 98 and have guiding grooves (see FIG. 10) for receiving the profiled facings. In this connection, reference is also made to FIG. 7, which shows the parts which are still to be described, together with their reference characters, as well as the guiding rollers rolling on top of the profiled core, with their diagrammatically indicated axles. FIG. 7 shows in its essential part the converging means of FIG. 6 on a larger scale, particularly a portion provided with a guiding roller 104 in conjunction with a mounting plate 205 so that there is a fixed association between an expanding wedge housing 122 and a converging assembly 149. Because the flanges of the profiled facings extend upwardly in FIG. 7 adjacent to the guiding roller 104, the deflection to conform to the belt conveyor 92 will ensure that the expansion will be mechanically maintained as the profiled facing is converged with the profiled metal core on the conveyor line 2.

Figure 8:
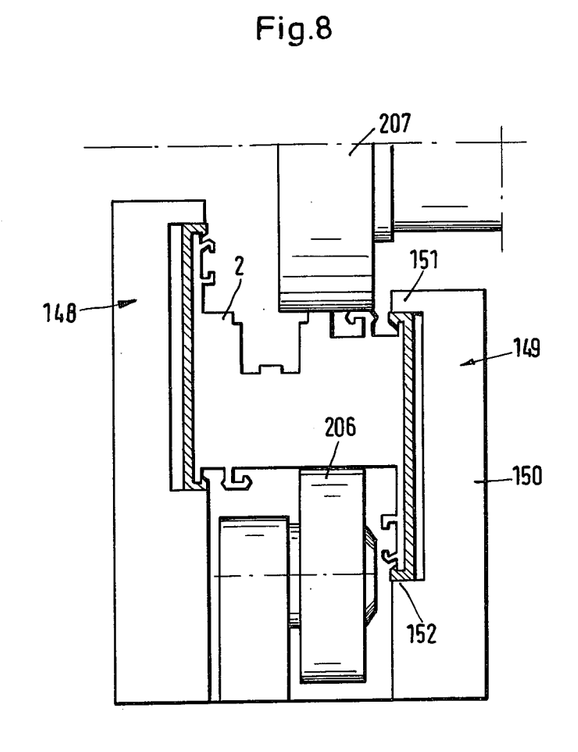
FIG. 8 is a sectional view taken on line VIII—VIII of FIG. 7.
Figure 9:
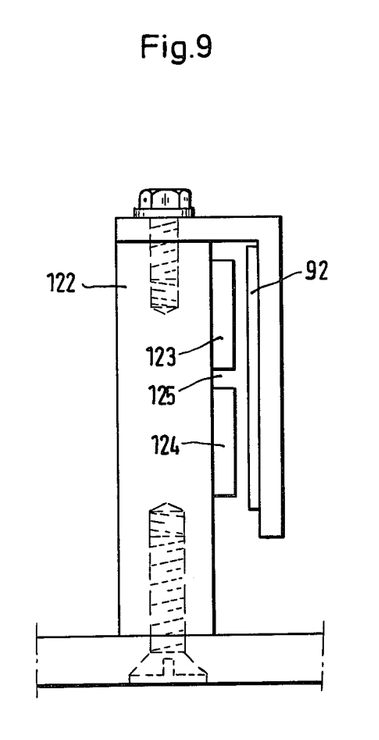
FIG. 9 is a sectional view taken on line IX—IX in FIG. 7.

FIGS. 8 and 9 show the respective states. FIG. 8 illustrates also the converging means 148, 149, which are vertically offset, at an intermediate profiled metal core, which has web edges which have already been embraced by the profiled facings under pressure. Upper and lower guide rollers 206, 207 are also apparent.

FIG. 9 shows details of an expanding wedge assembly which will now be described more fully.

Each of the belt guides 89, 90 comprises a length section 101 or 102, which is disposed beside the pressure contact roller 93 or 94 and parallel to the conveyor line 2 so that the inner portion of the belt 91, 92 directly assists the guidance of the profiled metal core. The two length sections 101, 102, on the one hand, and 95, 96, on the other hand, are trained around guiding rollers 103, 104 or 105, 106, which are included in the belt guides. The guide rollers 105, 106 are provided with collars, e.g., at their ends, so that the belts will also be guided in height.

The guiding rollers 103, 104 are so arranged that the smooth surfaces of the rollers are coplanar with the converging means 148, 149. The above-mentioned deflection of the profiled sheath bars around the rollers 103 and 104 has the result that the side flanges expanded by the expanding wedge devices 120, 121 will be held open until the profiled facing has been deflected to extend parallel to the profiled metal core which is to be covered.

Figure 10:
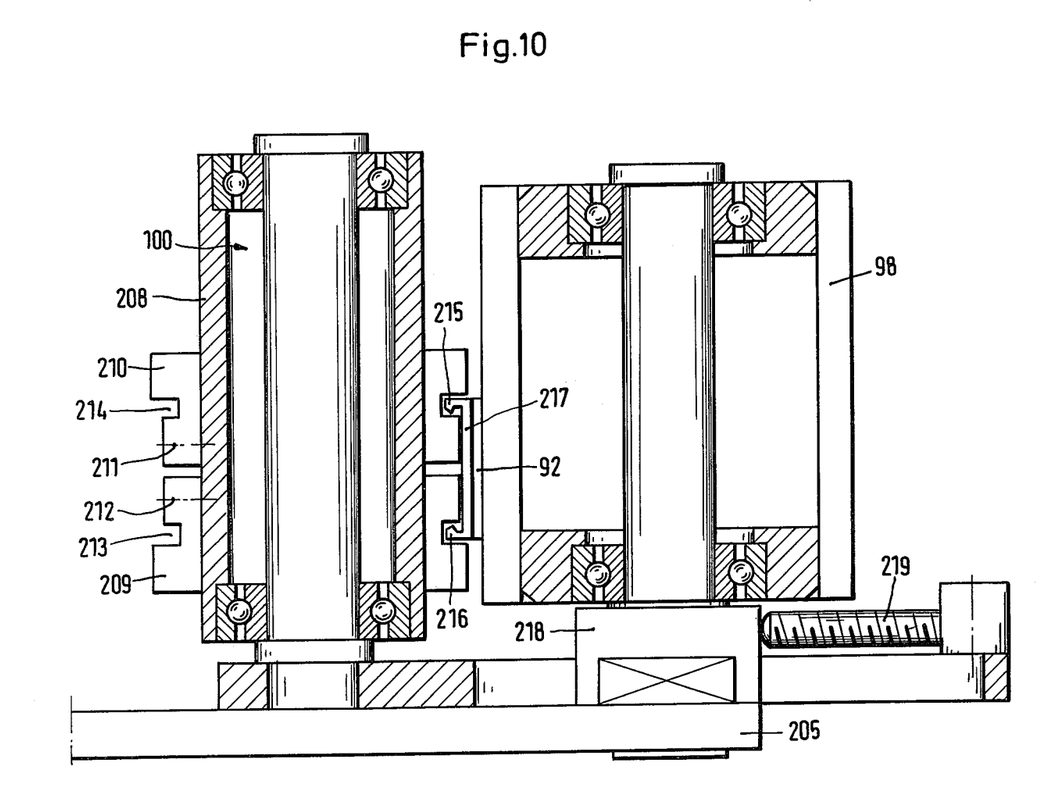
FIG. 10 is a sectional view taken on line X—X in FIG. 6.

FIG. 10 is a sectional view showing a part of FIG. 6. The roller 100 for vertical guidance has a shell 208, which is provided in its lower portion with a guide ring 209 and is provided with a second guide ring 210, which is adjustable along the axis of the roller and adapted to be fixed in a predetermined elevation. The fixing means consist of radial set screws 211 and 212, which are diagrammatically indicated. These guide rings are provided on on the outside with guide grooves 213, 214 for receiving the side flanges 215, 216 of a profiled facing 217, the back of which is moving in contact with the guide belt 92, which is trained around the conveyor roller 98. For a further adjustment, the bearing bracket 218 for the conveyor roller 98 is adjustable into engagement with the roller 100 for vertical guidance adjacent to this arrangement, particularly on the extended mounting plate 205, by means of bearing-adjusting means 219.

As is apparent from FIG. 1, a bearing support 107 for the entire subassembly shown in FIG. 6 is mounted in the carrying frame and carries the corresponding bearing subassemblies for the rollers shown. These bearing subassemblies are not shown in detail. The bearing support 107 comprises mounting plates 108, 109.

One roller of each of the strip guides 89, 90, e.g., the contact pressure roller 93, 94, is driven. The transmission and motor means provided for this purpose are indicated at 110, 111 and 112, 113 in FIG. 1. Alternatively, a common motor provided with change gears may be used.

Figure 12:
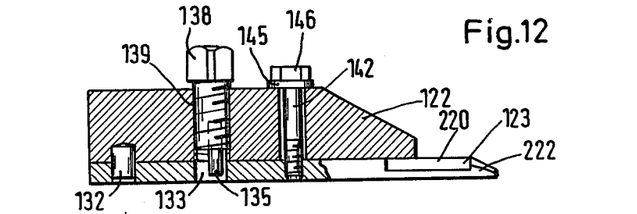
FIG. 12 is a sectional view taken on line XII—XII in FIG. 11.
Figure 13:
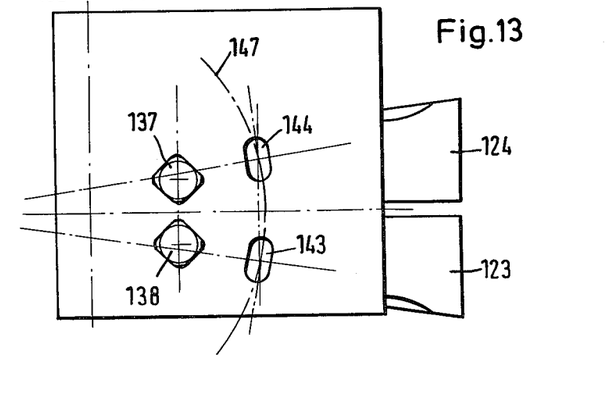
FIG. 13 is a top plan view of FIG. 12 for an explanation of the adjusting and mounting means which protrude outwardly from the expanding wedge housing.

The bearings 114, 115 (FIG. 6) of the contact pressure rollers are mounted in the bearing support 107 in guiding members 116, 117 extending at right angles to the conveyor line 2 and are biased by pressure-applying means, such as springs 118, 119, which are supported in the bearing support 107. The springs 118, 119 may be replaced by pneumatic piston-cylinder devices or the like. Each of the sections 95, 96 which include an acute angle with the conveyor line 2 incorporate an expanding wedge assembly 120, 121, which will be described in detail with reference to FIGS. 11 to 13.

Each expanding wedge assembly 120, 121 comprises an expanding wedge housing 122 (FIG. 11), in which two expanding members 123, 124 are mounted, which are pivotally movable relative to each other and are spaced a distance 125 apart. Each expanding member 123 or 124 has an edge 126 or 127 provided with a ramp 128 or 129 which is in sliding contact with an angled side flange of the strip-like profiled facing so that said flanges are expanded as the profiled facing moves over said expanding members 123, 124.

Figure 11:
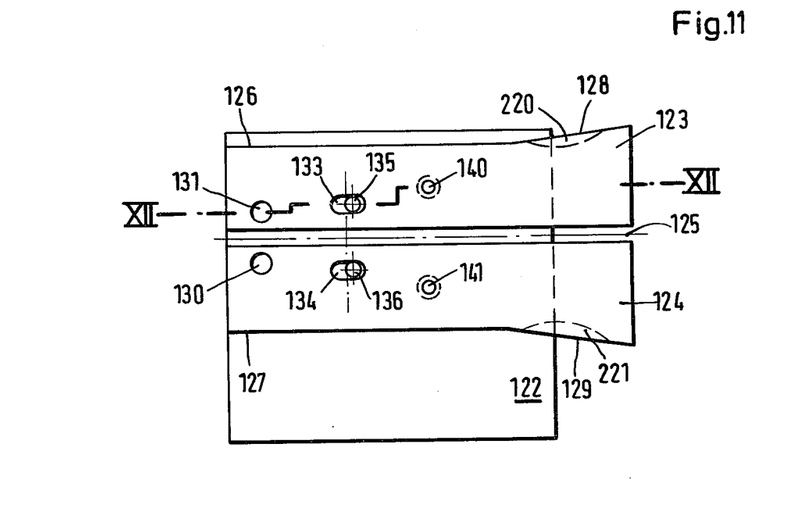
FIG. 11 is an elevation showing an expanding wedge assembly viewed in the direction of the arrow XI in FIG. 6.

Adjacent to the ramps 128, 129, the outside surface is formed with flutes 220, 221 so that a fine wedge shape is obtained in conjunction with a chamfer 222.

At the entrance end of the housing 122, a pivot 130 or 131 consisting of a pin 132 is disposed between the housing 122 and each expanding member 123 or 124. Slots 133, 134 are provided at a distance from said pin 132 toward the ramp end and receive eccentric pins 135, 136, which are eccentrically formed on adjusting screws 137, 138 in threaded engagement with tapped holes 139 of the housing 122.

Each expanding member 123 or 124 has a tapped hole 140 or 141 in threaded engagement with an associated retaining screw 142, which extends through an elongated hole 143 or 144 of the expanding wedge housing 122 and its head 146 has a head flange 145, which bears on a guide 147 which is provided on the outside of the housing 122 and indicated in phantom. This bearing ensures that the expanding members will be held flat on the housing in spite of the adjustability which is illustrated.

Converging means 148, 149 are provided directly on those length sections 101, 102 of the belt guides which are parallel to the conveyor line 2 (FIG. 6). These converging means are specifically shown in FIGS. 16 to 20. They consist of channel members, which have a vertical web 150 and top and bottom legs 151, 152, which extend over the previously expanded side flanges of the strip-like profiled facings which have already been guided over the edges of the profiled metal core. As the distance between the legs 151, 152 increases during the movement in the direction of travel indicated by the arrow 153, the side flanges are forced against the edges of the profiled metal core without forcing the profiled facing from the driven conveyor belt 91 which moves in unison and bears on the polished engaging surface formed by the inside surface of the web 150. The channel members of the converging means 148, 149 are detachably secured in a housing by fastening means, such as screw holes 154, 155, so that the channel members can be replaced in adaptation to the sizes of the profiled cores and the material characteristics.

Figure 14:
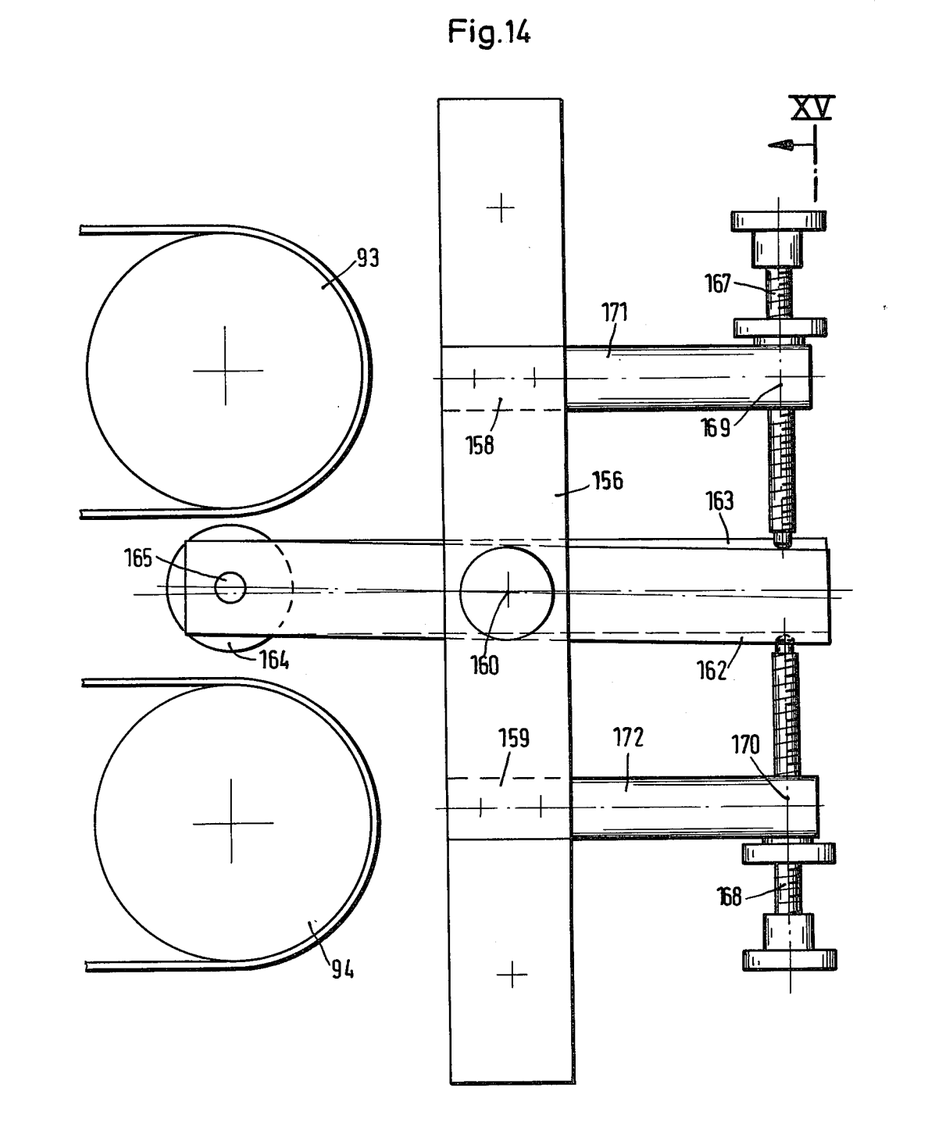
FIG. 14 is an enlarged top plan view showing a portion of FIG. 6 with adjusting means provided on two sides.
Figure 15:
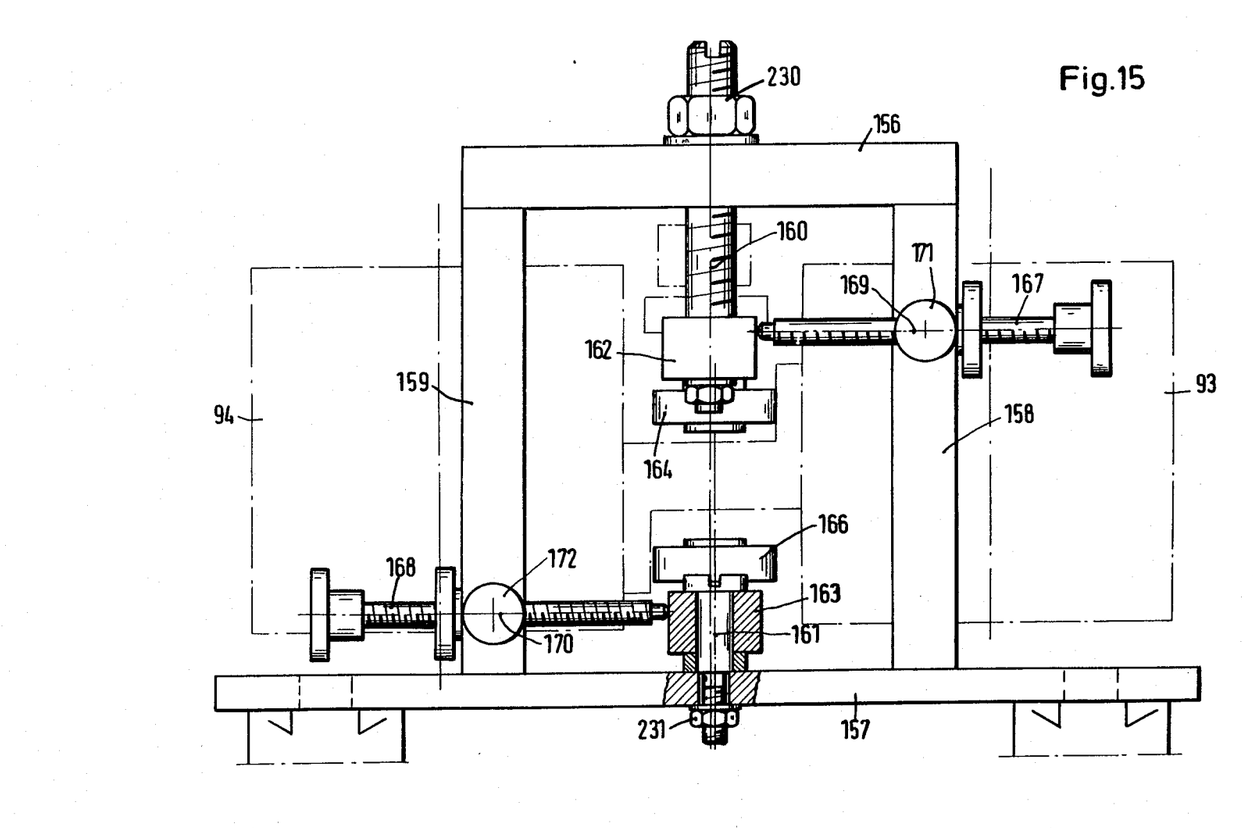
FIG. 15 is a partly sectional end view taken in the direction of the arrow XV in FIG. 14.

As is apparent from FIGS. 1 and 15, guide beams 156, 157 are mounted on the bearing support 107 and extend over and under the conveyor line 2. The upper guide beam 156 is seen also in FIG. 14 and in FIG. 15, which shows also that the upper guide beam 156 is secured to vertical legs 158, 159, which are secured to the lower guide beam 157, which is mounted in the carrying frame. The guide beams are provided with pivots 160, 161, which may consist of screws 230, 231, which are vertically adjustably mounted on the guide beams 156, 157. The elevation may be determined by washers or by locknuts on screw-threaded portions of the pivots.

Pivoted levers 162, 163 are mounted on said pivots. The upper pivoted lever 162 is seen also in FIG. 6. It is apparent that the pivoted lever 162 extends between the contact pressure rollers 93, 94 and carries a backing roller 164, which is rotatably and captively mounted, e.g., on a pin 165, which is carried by the pivoted lever 162. A backing roller 166 is mounted on the lower pivoted lever 163 (FIG. 15). It is apparent from FIG. 4 that the profiled metal core 21 has longitudinal webs 22, 23, which are engaged by the backing rollers 164, 166. For this purpose, adjusting means 167, 168 are provided, which act on the pivoted levers 162, 163 from different sides and consist particularly of adjusting screws. Compression springs may be provided between the engaging ends of said adjusting screws and the pivoted levers 162, 163. The adjusting screws 167, 168 extend through tapped holes 169, 170 in the vertical legs 158, 159 or through mounting lugs 171, 172, which are formed on said vertical legs 169, 170 and protrude therefrom parallel to the conveyor line 2.

All these parts are supported by the carrying frame 1; the parts described last are supported by the bearing support 107. All adjusting screws are adjusted by hand.

Figures 16, 17, 18, 19A, 19B, 19C, 20:
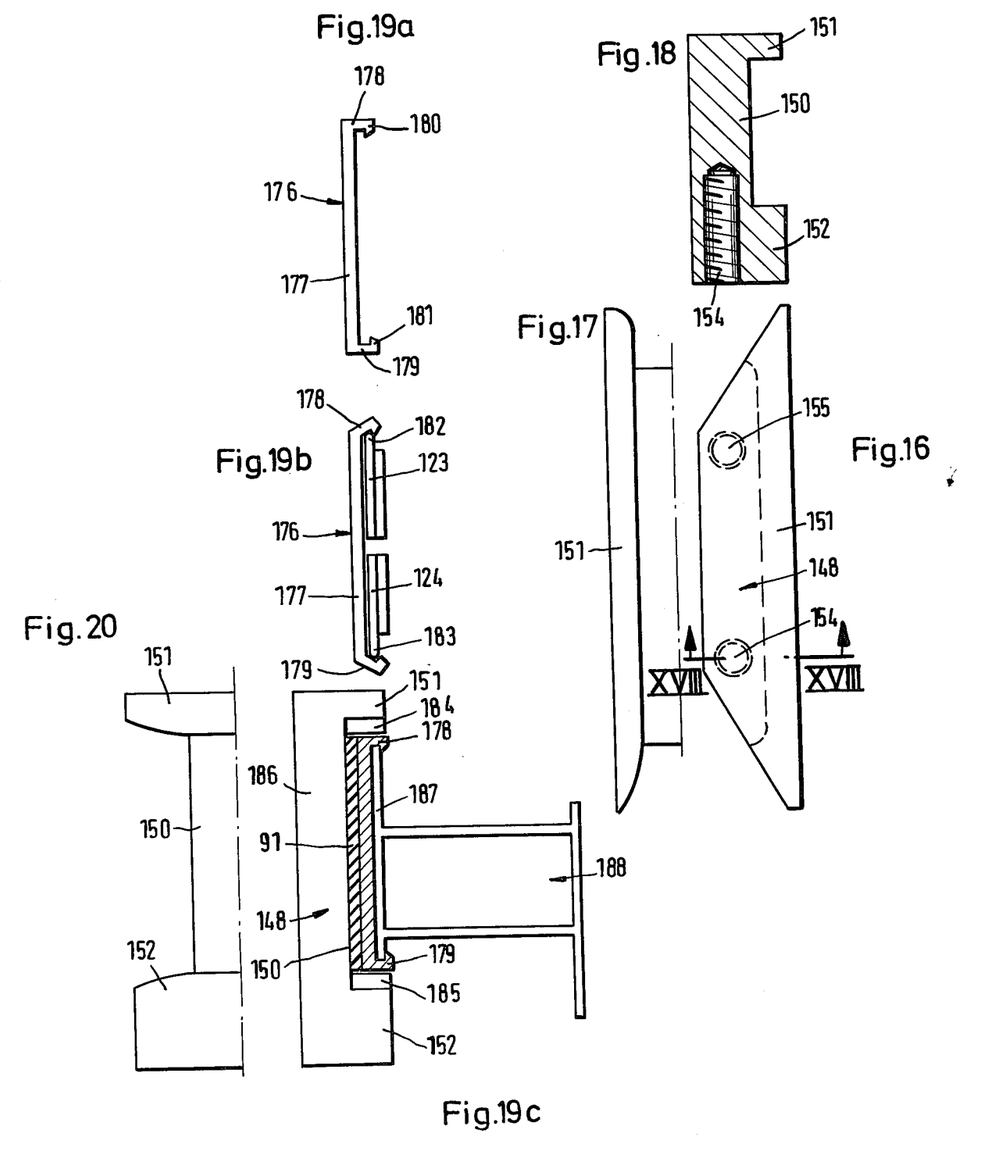

FIG. 19a shows the cross-section of the striplike profiled facing 176, which has a web 177, which covers the outside surfaces of the profiled metal core, and upwardly and downwardly extending, angled side flanges 178, 179, which have inwardly extending, angled extensions 180, 181, which embrace egess of webs of the profiled inner bar of metal.

FIG. 19b shows that profiled facing on the expanding members 123, 124 in a position in which the side flanges 178, 179 are expanded. It is apparent that the expanding members 123, 124 have rounded edge portions 182, 183 facing away from each other or increase in steepness as the expansion proceeds.

The legs 151, 152 of the converging means 148, 149 have correspondingly shaped inside surfaces 184, 185. They may be formed with a flute or may have an inclination which changes in the direction of travel in such a manner that the widest part includes an angle in excess of 90° with the intermediate portion and that angle decreases continuously so that the side flanges 178, 179 will be forced onto the edges of a web 187 of a profiled metal core 188.

FIG. 20 is an end view of FIG. 19c at the entrance end of the converging means. It is apparent that the opening flares opposite to the direction of travel.

We claim:

1. In apparatus for making profiled bars for windows, doors and other frames, which comprise profiled metal cores and profiled facings having angled side flanges, which apparatus comprises a carrying frame, a conveyor line for handling the profiled metal cores, an adhesive-applying station in the carrying frame, tangentially extending feeders with conveying means for handling profiled facings to be applied to opposite sides of the profiled metal cores, which feeders are provided on the carrying frame behind the station in the direction of travel of the conveyor line and include spreading wedge assemblies for spreading angled side flanges beyond edges of side walls of the profiled metal core, the improvement residing in that subassemblies are provided in the adhesive-applying station on opposite sides of the conveyor line and comprise vertical and pivoted axles on which applying rollers are mounted, means for automatic adaptation to any distortion of the profiled metal core, and said feeders compriese belt guides, which are close to the side faces of a profiled metal core and include converging means for forcing the angled side flanges against the profiled metal cores, pivots in association with said subassemblies mounted in the carrying frame on both sides of the conveyor line and extending parallel to the latter, and pivoted aligning means which consist of pendulum weights carried by the subassemblies.

2. The improvement set forth in claim 1, wherein the pivoted subassemblies comprise a carrier, which carries pivot pins extending at right angles to the pivots, a holder is pivoted on the pivots, an adhesive-applying roller is rotatably mounted in said holder, said holder is two-armed and consists of an upper mounting arm, pivoted on an upper portion of the pivot pin and a lower mounting arm pivoted on a lower portion of said pivot pin, said adhesive-transferring roller is mounted with a backlash in two pivoted arms, tension springs are provided, which are connected at one end to said two mounting arms and at their opposite end to said pivoted arms, and two adjusting screws are provided in the upper and lower portions, respectively, of each of said mounting arms and have heads which bear on the pivoted arms and act in opposition to the force of the tension springs, and can be adjusted to different positions for a fine adjustment of the clearance between the adhesive-applying rollers and the adhesive-transferring rollers and of the thickness of the adhesive layer which will be applied.

3. The improvement set forth in claim 2, wherein a compression spring and means for adjusting said compression spring are provided between the mounting arms and the carrier and adjusting screws are provided between the holder and the mounting arms.

4. The improvement set forth in claim 2, wherein an adhesive feeder is mounted in the carrying frame beside the adhesive-applying roller and comprises an adhesive source and a resilient doctor, which at its edge facing the applying roller is adjustably supported by two screws, which engage the top and bottom surfaces of the doctor.

5. In apparatus for making profiled bars for windows, doors and other frames, which comprise profiled metal cores and profiled facings having angled side flanges, which apparatus comprises a carrying frame, a conveyor line for handling the profiled metal cores, an adhesive-applying station in the carrying frame, tangentially extending feeders with conveying means for handling profiled facings to be applied to opposite sides of the profiled metal cores, which feeders are provided on the carrying frame behind the station in the direction of travel of the conveyor line and include spreading wedge assemblies for spreading angles side flanges beyond edges of side walls of the profiled metal core, the improvement residing in that subassemblies are provided in the adhesive-applying station on opposite sides of the conveyor line and comprise vertical and pivoted axles on which applying rollers are mounted, means for automatic adaptation to any distortion of the profiled metal core, and said feeders comprise belt guides, which are close to the side faces of a profiled metal core and include converging means for forcing the angled side flanges against the profiled metal cores, the belt guides comprise contact pressure rollers and means for urging said contact pressure rollers toward the conveyor line, said belt guides further comprising deflecting means for deflecting the belt around the contact pressure rollers, one length section of each belt guide extends parallel to the conveyor line closely adjacent thereto, another length section of each belt guide is inclined and extends at an acute angle from the conveyor line opposite to the direction of travel thereof, said carrying frame carries supply drums for the strip-like profiled facings, said supply drums are spaced from said inclined length section of the belt guide, deflecting rollers are provided, which are disposed near the transition from said inclined length section to said parallel length section and ensure a deflection of the striplike profiled facing on the side opposite to its flanges, said deflecting rollers constitute means for holding said flanges expanded, additional deflecting rollers are provided for guiding the expanded profiled facing onto the inner profiled bar of metal, and said converging means are provided in said parallel length section.

6. The improvement set forth in claim 5, in which each of said inclined length section comprises an expanding wedge assembly including an expanding wedge which consists of two expanding members, which are pivotally movable relative to each other, said expanding wedge has outside surfaces for contacting and guiding said expanded side flanges, pivot means are provided between the expanding members and an expanding wedge housing, which contains adjustably mounted expanding means, which consist preferably of screws having eccentric pins, which extend into slots of the expanding members, and the adjusting means also comprise adjusting pins guided in the expanding wedge housing.

7. The improvement set forth in claim 6, wherein each expanding member has a tapped hole in threaded engagement with a retaining screw, which extends through a slot, which is formed in the housing and concentric to the pivotal axis, and said screw has a head flange, which bears on a guide provided in the housing.

* * * * *

UNITED STATES PATENT AND TRADEMARK OFFICE
CERTIFICATE OF CORRECTION

PATENT NO. : 4,472,235
DATED : September 18, 1984
INVENTOR(S) : Heinz Pasche et al It is certified that error appears in the above-identified patent and that said Letters Patent is hereby corrected as shown below:

The heading of the Patent should read as follows:

-- [30] Foreign Application Priority Data

Nov. 10, 1981 [DE]    Fed. Rep. of Germany        3144543 --

*Signed and Sealed this*

*Twenty-sixth* Day of *March 1985*

[SEAL]

*Attest:*

DONALD J. QUIGG

*Attesting Officer*    *Acting Commissioner of Patents and Trademarks*